Patented May 30, 1944

2,350,145

UNITED STATES PATENT OFFICE 2,350,145

MOTOR FUEL COMPOSITION

William J. Backoff and Norman D. Williams, Chicago, John F. O'Loughlin, Winnetka, Harry L. Moir, Niles Center, and John S. Yule, Chicago, Ill., assignors to The Pure Oil Company, Chicago, Ill., a corporation of Ohio No Drawing. Application October 10, 1940, Serial No. 360,550

19 Claims. (Cl. 44—58)

This application is a continuation-in-part of our application Serial No. 233,613, filed October 6, 1938 entitled "Motor fuel compositions" and is a continuation-in-part of our application Serial No. 348,164 filed July 26, 1940 entitled "Compositions for treating motors and for addition to motor fuel" (now Patent No. 2,264,964).

This invention relates to the method of removing gum and carbonaceous deposits from mechanical parts, particularly internal combustion engines, and to novel compositions useful in connection therewith.

In the operation of internal combustion engines there is invariably formed as a result of the conditions of combustion, a deposit in the combustion chamber of the cylinders, on the piston heads, around the valves and also on the spark plugs, which materially interferes with proper and efficient operation of the motor. In the combustion zone the deposit causes what is commonly known as knocking or detonation of the fuel charge in the cylinders. Similar deposits may cause the piston rings and valves to become sluggish in their action, to tend to stick, and in some instances actually to stick. This deposit is commonly referred to as carbon, although it is not composed wholly of carbon but includes other material as mineral matter from road dust drawn into the carburetor, metallic particles, gum and rust, etc. The so-called carbon element of the deposit is largely a result of incomplete combustion of fuel and carbonization of mineral oil. The incomplete combustion of fuel not only accounts for carbon deposition but undoubtedly also accounts for a deposit of gum-like material as well, which under the prevailing conditions may be in a form ranging from a fairly soft gum to a hard, brittle varnish-like substance. For purposes of convenience, the deposits of materials in internal combustion engines, described in the foregoing paragraph, will be referred to as carbon deposits.

It has also been noted that motor fuels such as the usual gasolines now on the market, form a deposit of a gum-like residue in the intake system of internal combustion engines. This deposit is usually most noticeable in the intake manifold and around the intake valves, and is generally referred to as gum. This deposition of gum is very objectionable and may be the cause of the improper functioning, or failure to function, of the intake valves whereby the operating efficiency is materially impaired.

It is an object of this invention to provide a method for removing the gum and carbonaceous deposits from mechanical parts, particularly from the intake and combustion zones of internal combustion engines.

It is another object of the invention to provide a composition capable of removing gum and carbonaceous deposits from mechanical parts, particularly the intake and combustion zones of internal combustion engines.

It is a further object of this invention to provide a composition which is adapted to be used in conjunction with gasoline or other fuels in internal combustion engines. When this gasoline-solvent fuel mixture is used in internal combustion engines, it effectively minimizes the tendency toward formation of carbon and gum deposits in both the intake system and combustion zone and in those engines where deposits of carbon and gum are already present and are interfering with efficient operation, the deposits are substantially decreased and/or removed, restoring the engine to higher operating efficiency.

Still another object of our invention is to provide a material which may be used in conjunction with lubricating oils to reduce, minimize and remove carbon and gum deposits from internal combustion engines and from machinery in general where such deposits have a tendency to occur.

Further objects of the invention will appear from the following detailed description.

It is known that a number of substances have been used in the past with some degree of success to remove or prevent deposits of carbon and gum in internal combustion engines. As a result of laboratory investigation and of commercial usage, it has been found that the materials disclosed in the prior art fail to effectively remove the deposits from both the intake system and the combustion zone. These materials, although possibly producing a slight improvement in engine operating conditions, are unsatisfactory for the reason that removal or prevention of carbon deposits and gum in both the intake and combustion system is not effected.

In an effort to overcome the deficiencies of the earlier carbon and gum removing agents, frequently referred to as solvents, resort has been had to those materials which have a stronger and more powerful action, such halogenated organic compounds. The use of such materials frequently resulted in the corrosion of engine parts which, of course, was highly undesirable. The effect of simply increasing the amount of solvent additive has also been tried but this change generally results in increasing the deposit in the combustion zone, apparently as a result of carbonization of the solvent itself or as a result of the effect of the solvent action in the intake system, causing removal of the deposit there and the carrying of the deposit into the combustion zone where, due to the difference in conditions, such as temperature and pressure, deposition of material resulted and the deposit in the combustion zone increased.

We have discovered that if certain compounds are injected together in proper proportions into an engine in the manner hereinafter described, gum and carbonaceous deposits which accumulate in the intake and combustion zones of internal combustion engines can be removed to such an extent that a mechanically sound motor after such removal will have its octane requirement reduced to approximately that of the same engine if it were completely mechanically cleaned and reconditioned. The efficiency of the engine is also improved to the point where it is in condition to operate with lower fuel consumption than before the injection of the aforesaid compounds. After the engine is placed in this improved condition, if the engine is run on gasoline containing our novel solvent the ability of the engine to run with lower fuel consumption is maintained. While the nature of the solvent effect of the proposed combinations is such as to be classed as very active, under the conditions which it is used, yet the material is non-corrosive and does not injure in any way the metal parts with which it comes in contact. The materials used in preparing the solvent in accordance with this invention are: (1) aliphatic alcohols boiling over 350° F. having excellent gum solvent properties at elevated temperatures, and which may or may not have good gum solvent properties at ordinary temperatures; and (2) a compound or a mixture of compounds boiling below 350° F., having good solvent properties at ordinary temperatures, and which may be selected from the group consisting of esters of aliphatic acids, aliphatic alcohols and aliphatic ketones. As an example of the first group may be mentioned octyl alcohol. Examples of group 2 are ethyl butyl acetate, methyl amyl acetate, acetone, methyl amyl ketone, ethyl alcohol and ethyl acetate. The esters referred to are of that class of compounds that are true esters, i. e., an organic salt formed from an alcohol and an organic acid by elimination of water. The proportions of the various compounds indicated which may be used in such combinations of solvent materials may vary from 19 parts of a compound or mixture of compounds from group (1) as above defined, to 1 part of a compound or mixture of compounds from group (2) as above defined, to 1 part of the former to 19 parts of the latter, by volume. However, it is preferable to stay within the limits of from 17 parts of (1) to 3 parts of (2), to 3 parts of (1) to 17 parts of (2). The proportions which give best results vary somewhat with the different compounds but fall within the range set forth. Material from each of groups (1) or (2) should be present in the composition to the extent of at least 5% by volume and preferably 15% by volume.

Compositions in accordance with this invention in order to be most effective are injected into the engine to be treated when the engine is at normal driving temperature. The preferred method of injecting the solvent into so-called gasoline engines is to remove the air cleaner from the carburetor, and while the engine is running slightly faster than when idling, approximately eight ounces of the composition is injected into the throat of the carburetor. The ignition is then turned off and the spark plugs removed. Approximately eight more ounces of the composition is injected into the engine through the spark plug holes, the composition being approximately evenly divided among the cylinders. The engine is then allowed to stand for about 15 minutes and after having replaced the spark plugs, the engine is run for a short time with throttle partially open and then accelerated intermittently until the exhaust smoke clears up. The entire treatment requires approximately one-half hour.

It will be apparent that more or less than 16 ounces of solvent may be used for a motor treatment depending on the condition and size of the motor and the concentration of the active ingredients in the solvent mixture.

When using the composition in the manner above described to eliminate deposits from the engine, it is advantageous to mix the ingredients of the solvent or treating composition with a vehicle. A suitable vehicle is a refined mineral oil fraction or a mineral oil distillate boiling within the range of approximately 350° F. to 850° F. Kerosine, gas oil and white mineral oil having a Saybolt viscosity between 65 and 75 at 100° F. are suitable vehicles. Other vehicles boiling within the range of 350°–850° F. and either hydrocarbon or non-hydrocarbon may be used provided they have good penetrating and wetting characteristics with respect to the deposits. Pine oil is an example of such vehicles. The vehicle assists in thoroughly bringing the solvent composition into contact with the deposits which it is desired to remove and thereby enhances the effectiveness of the solvent composition in removing the depositions.

The quantity of vehicle may preferably comprise a minor portion of the composition and approximately 20% by volume has been found to be particularly effective when the solvent is injected directly into the motor. However, where the solvent is incorporated as an additive in gasoline or other motor fuel of similar boiling range, it has been found necessary to incorporate larger amounts of the vehicle to obtain satisfactory results and the vehicle should have a boiling range higher than that of kerosine distillate and a viscosity preferably between 70 and 500 seconds Saybolt Universal at 100° F. When the solvent is incorporated in the motor fuel as an additive, the ingredients in the solvent should be maintained within certain definite ratios to obtain satisfactory results but may be varied within the limits of at least 50% by volume of vehicle (mineral oil or other equivalent material of required boiling range, viscosity, penetrating and wetting characteristics), 5% to 15% of one or more compounds selected from group (2) and the remainder being composed of at least 5% of one or more compounds from group (1).

When treating engines of the Diesel or semi-Diesel type the solvent may be applied to the engine by injecting it directly into the ports and/or placing a high concentration (5–15%) of the solvent in the fuel fed to the engine. The solvent may be applied to gasoline engines also by feeding gasoline containing high concentration of the solvent to the motor.

The quantity of solvent which, when added to motor fuel either of the gasoline, Diesel or semi-Diesel type is necessary to effectively remove and/or minimize gum and carbon deposits may vary considerably depending on the type of engine, condition of engine, the particular fuel employed, and the operating conditions encountered. A maximum of 5% and usually not over 1% of solvent, based on the volume of motor fuel, is sufficient. In general, it has been found that from 0.1% to 0.5% of solvent gives satisfactory results. The amount of solvent to be used will vary, within the limits specified, with different engines and with the type of service to which the engine is subjected. It has been found by experiment that, in some cases, deviation from the proportions specified noticeably diminishes the efficacy of the solvents as indicated by an increase in the deposit in the combustion zone.

When using the novel solvent in Diesel or semi-Diesel fuels, all or a substantial portion of which, for example, above 5%, boils above the kerosine boiling range, it is not necessary to use a vehicle for the reason that the constituents in the fuel boiling above the kerosine range act as a vehicle. Thus the vehicle may be added to or omitted from the solvent as desired. Where the vehicle is omitted the solvent comprising a mixture of group 1 and group 2 compounds may be added in amounts of .02 to 2.5% by volume of the fuel. The ratio of group 1 to group 2 constituents in the solvent will be the same as that previously set forth, namely, from 1 part to 19 parts of group 1 to 19 to 1 parts of group 2.

When fuels are used containing solvents in accordance with this invention, the motor deposits, instead of being hard and of such a nature as to be continuously built up to such a point as to ultimately affect, sometimes seriously, the operation of the engine, as demonstrated by its performance, are not only reduced in quantity but are soft and flaky. Parts of the metal are entirely bare, indicating that after a small amount of deposit accumulates it does not adhere to the metal, and consequently passes out of the motor in the exhaust gases. Engines operated on the solvent-containing motor fuels run much quieter than when operating on the same motor fuel which contains no solvent. This indicates that the octane number of the fuel required to produce a given standard of performance is lower when the solvent is present in the fuel.

Although the use of our novel gum solvents has been more particularly described in connection with removal of gum and carbonaceous deposits from the intake and combustion zones of automotive engines and in connection with motor fuels, it is to be understood that the solvents are useful as additives to motor oils and to lubricating oils in general where the problem of gum and carbon deposition is encountered. For example, when added in amounts ranging from 1% to 5% to motor oils, depositions of carbon on the piston rings are substantially minimized and removed. Likewise, gum deposition is substantially avoided when the gum solvents are used in the same proportions in industrial lubricating oils as, for example, spindle oils. When used in connection with lubricating oils, the solvent does not require the addition of vehicles since the oil itself acts as a vehicle.

The foregoing general description of the invention and the specific examples described are sufficient to enable one skilled in the art to appreciate its value. The invention is not limited to the specific examples disclosed or to any particular theory or mechanism of the action of the gasoline additive but is to be interpreted as broadly as the prior art permits in view of the following claims.

We claim:

1. A composition useful as a gum solvent comprising a minor but substantial portion of hydrocarbon vehicle boiling within the range of 350° F. to 850° F. and having good wetting and penetrating characteristics with respect to gum of the type deposited from motor fuels, not less than 5% by volume of aliphatic alcohol boiling above 350° F. having gum solvent properties at elevated temperatures, and not less than 5% by volume of material boiling below 350° F. having gum solvent properties at normal temperatures and selected from the group consisting of esters of aliphatic acids, aliphatic ketones and aliphatic alcohols.

2. Composition in accordance with claim 1, in which the aliphatic alcohol is octyl alcohol and material boiling below 350° F. is an ester of acetic acid.

3. A composition useful as a gum solvent, comprising a mixture containing, a minor but substantial proportion of refined mineral oil boiling within the range of 350° F. to 850° F., not less than 5% by volume of an aliphatic alcohol boiling above 350° F. which has gum solvent properties at elevated temperatures and not less than 5% by volume of an ester of acetic acid boiling below 350° F. which has gum solvent properties at normal temperatures.

4. A composition useful as a gum solvent comprising a major portion of refined mineral oil boiling above the boiling range of kerosine, a minor portion but not less than 5% of aliphatic alcohol boiling above 350° F. having gum solvent properties at elevated temperatures and between 5% and 15% of material boiling below 350° F. having gum solvent properties at normal temperatures and selected from the group consisting of esters of aliphatic acids, aliphatic ketones and aliphatic alcohols.

5. A composition useful as a gum solvent comprising a major portion of refined mineral oil boiling above the boiling range of kerosine, a minor portion but not less than 5% of octyl alcohol and between 5% and 15% of ester of acetic acid boiling below 350° F. having gum solvent properties at normal temperatures.

6. A hydrocarbon motor fuel containing from 0.1% to 5% of a mixture containing 50% to 90% of refined mineral oil boiling above the kerosine boiling range, not less than 5% of aliphatic alcohol boiling above 350° F. having gum solvent properties at elevated temperatures and 5% to 15% of material boiling below 350° F. having gum solvent properties at normal temperatures and selected from the group consisting of esters of aliphatic acids, aliphatic ketones and aliphatic alcohols.

7. A hydrocarbon motor fuel containing from 0.1% to 5% of a mixture containing 50% to 90% of refined mineral oil boiling above the kerosine boiling range, not less than 5% of aliphatic alcohol boiling above 350° F. having gum solvent properties at elevated temperatures and 5% to 15% of ester of aliphatic acid boiling below 350° F. having gum solvent properties at normal temperatures.

8. A hydrocarbon motor fuel containing from 0.1% to 5% of a mixture containing 50% to 90% of refined mineral oil boiling above the kerosine boiling range, not less than 5% of aliphatic alcohol boiling above 350° F. having gum solvent properties at elevated temperatures and 5% to 15% of aliphatic ketone boiling below 350° F.

having gum solvent properties at normal temperatures.

9. A hydrocarbon motor fuel containing from 0.1% to 5% of a mixture containing 50% to 90% of refined mineral oil boiling above the kerosine boiling range, not less than 5% of aliphatic alcohol boiling above 350° F. having gum solvent properties at elevated temperatures and 5% to 15% of aliphatic alcohol boiling below 350° F. having gum solvent properties at normal temperatures.

10. A hydrocarbon motor fuel containing from 0.1% to 5% of a mixture containing 50% to 90% of refined mineral oil boiling above the kerosine boiling range, not less than 5% of octyl alcohol and 5% to 15% of ester of acetic acid boiling below 350° F. having gum solvent properties at normal temperatures.

11. The method of removing gum and carbonaceous deposits from mechanical parts, which comprises contacting said parts while at elevated temperatures with a mixture of a minor but substantial portion of hydrocarbon vehicle boiling within the range of 350° F. to 850° F. and having good wetting and penetrating characteristics with respect to gum of the type deposited from motor fuels aliphatic alcohol boiling above 350° F. having gum solvent properties at elevated temperatures and material boiling below 350° F. having gum solvent properties at normal temperatures and selected from the group consisting of aliphatic esters, aliphatic ketones and aliphatic alcohols, the aliphatic alcohol and material boiling above 350° F. each being present in amounts not less than 5% by volume.

12. Method in accordance with claim 11 in which the aliphatic alcohol boiling above 350° F. is octyl alcohol and material boiling below 350° F. is ester of acetic acid.

13. The method of removing carbonaceous deposits from internal combustion engines, which comprises bringing into contact with said deposits while the engine is hot, a minor but substantial portion of mineral oil vehicle boiling within the range of 350° F. to 850° F. and having good wetting and penetrating characteristics with respect to gum of the type deposited from motor fuels aliphatic alcohol boiling above 350° F. having gum solvent properties at elevated temperatures and material boiling below 350° F. having gum solvent properties at normal temperatures and selected from the group consisting of aliphatic esters, aliphatic ketones and aliphatic alcohols, the volume of aliphatic alcohol and material boiling above 350° F. each being not less than 5% of the total volume used permitting the mixture to remain in contact with the deposits for a sufficient period of time to penetrate and wet the same, and eliminating the loosened deposits from the engine through the exhaust by starting the engine.

14. The method of removing gum and carbon deposits from internal combustion engines which comprises injecting into said engines the following materials in the following proportions: (1) aliphatic alcohol boiling above 350° F. having gum solvent properties at elevated temperatures—not less than 5%, (2) material boiling below 350° F. having gum solvent properties at normal temperatures and selected from the group consisting of esters of aliphatic acids, aliphatic ketones, and aliphatic alcohols—not less than 5%, (3) a minor but substantial portion of mineral oil vehicle boiling within the range of 350° F. to 850° F. and having good wetting and penetrating characteristics with respect to gum of the type deposited from motor fuels.

15. Composition in accordance with claim 1 in which the aliphatic alcohol boiling above 350° F. is present to the extent of at least 5% by volume and the material boiling below 350° F. is present to the extent of approximately 5 to 15% by volume.

16. A composition in accordance with claim 11 in which the aliphatic alcohol boiling above 350° F. is present to the extent of at least 5% by volume and the material boiling below 350° F. is present to the extent of approximately 5 to 15% by volume.

17. Method in accordance with claim 13 in which the aliphatic alcohol boiling above 350° F. is present to the extent of at least 5% by volume and the material boiling below 350° F. is present to the extent of approximately 5 to 15% by volume.

18. Method in accordance with claim 14 in which the material from group 2 is present to the extent of approximately 5 to 15% by volume.

19. A composition useful as a gum solvent for deposits in internal combustion engines comprising a substantial portion of vehicle selected from the group consisting of mineral oil and pine oil, boiling within the range of 350° F. to 850° F. and having good wetting and penetrating characteristics with respect to gum of the type deposited from motor fuels, at least 5% by volume of aliphatic alcohol boiling above 350° F. having gum solvent properties at elevated temperatures, and at least 5% by volume of material boiling below 350° F. having gum solvent properties at normal temperatures and selected from the group consisting of esters of aliphatic acids, aliphatic ketones and aliphatic alcohols.

WILLIAM J. BACKOFF.
JOHN S. YULE.
JOHN F. O'LOUGHLIN.
HARRY L. MOIR.
NORMAN D. WILLIAMS.